Sept. 22, 1964 P. SENSI ETAL 3,150,046
ANTIBIOTIC RIFAMYCIN B AND METHOD OF PRODUCTION
Filed March 4, 1960
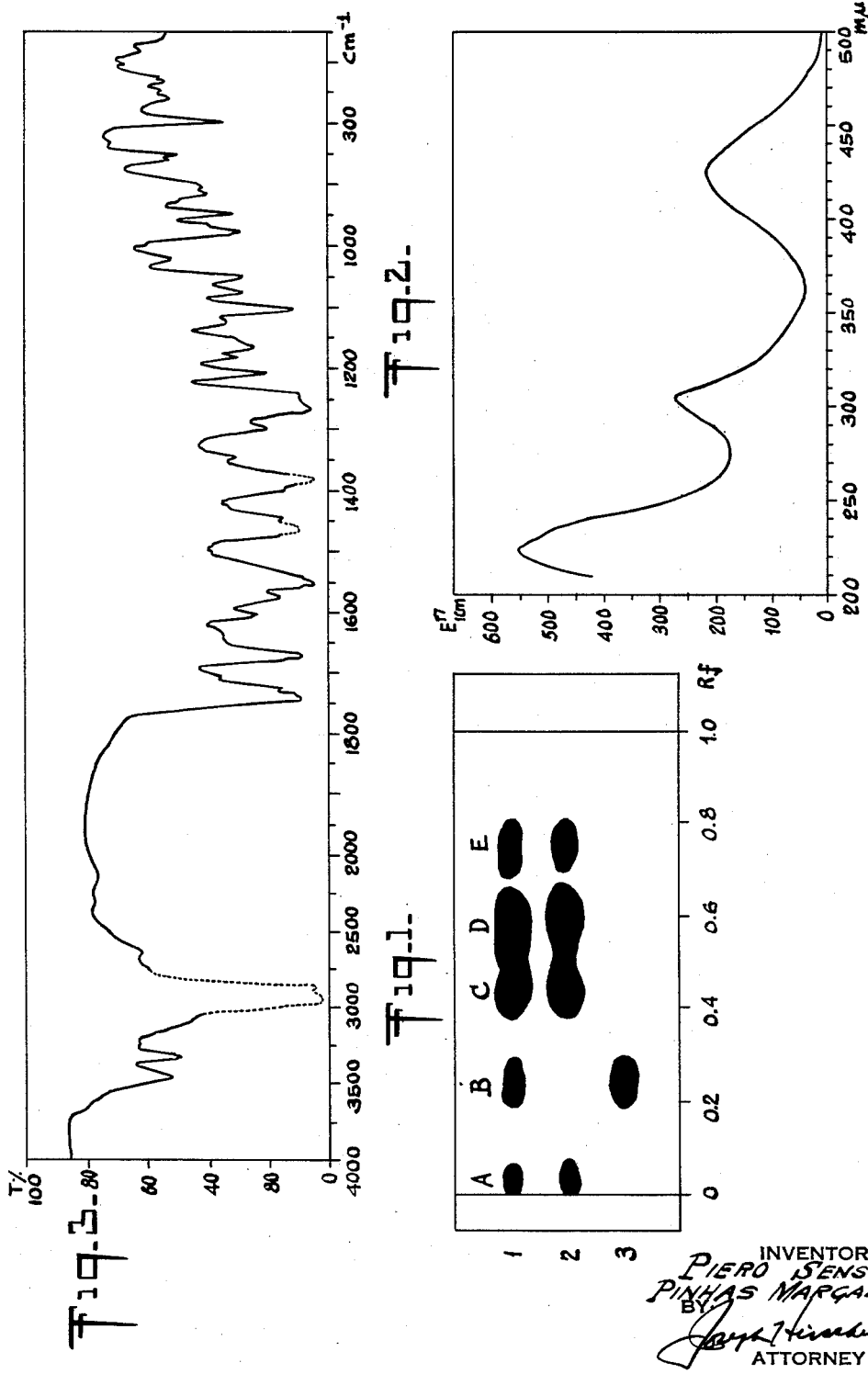
INVENTORS:
PIERO SENSI
PINHAS MARGALITH
BY
ATTORNEY:

United States Patent Office 3,150,046
Patented Sept. 22, 1964

3,150,046
ANTIBIOTIC RIFAMYCIN B AND METHOD
OF PRODUCTION
Piero Sensi, Milan, Italy, and Pinhas Margalith, Pardess-Chana, Israel, assignors to Lepetit S.p.A., Milan, Italy
Filed Mar. 4, 1960, Ser. No. 12,654
Claims priority, application Great Britain, Aug. 12, 1958, 25,905/58; Dec. 19, 1958, 41,094/58
11 Claims. (Cl. 167—65)

This invention relates to substances having antibiotic properties and to the processes of preparing them. More particularly, in accordance with the present invention there is provided a new and improved antibiotic comprising rifamycin and its components A, B, C, D, E.

The original name, rifomycin, has, since the filing of this application, been changed to "rifamycin," by which name the antibiotics of the present invention will be hereinafter designated.

The present invention also provides a process for producing rifamycin and its components which comprises cultivating a rifamycin-producing strain of a Streptomyces belonging to the red series, rectus-flexibilis sectio of Pridham et al. as hereinafter described, and designated by us as *Streptomyces mediterranei,* or any naturally occurring or artificially produced mutant thereof, in a culture medium containing assimilable sources of carbohydrate, nitrogen and inorganic salts until substantial antibiotic activity is imparted to the culture medium, and recovering rifamycin and its components from said medium.

This is a continuation-in-part of our copending application Serial No. 830,619, filed July 30, 1959, now abandoned.

The strain of the rifamycin producing Streptomyces, which has been filed with the American Type Culture Collection under the Code Number 13685, has been isolated from a sample of soil collected near St. Raphael (France) and shows the following characteristics observed upon various media in slant cultures for up to 20 days at 28° C. Colour determinations were made according to Maerz and Paul's Dictionary of Colour; McGraw-Hill, 1950.

Carvajal's oatmeal agar:[1] Fair growth with smooth surface. Vegetative mycelium hyaline to yellowish with pinkish reverse. Whitish aerial mycelium with pink tinge. Traces of yellowish soluble pigment.

Tomato paste oatmeal agar:[1] Fair growth, smooth surface. Vegetative mycelium hyaline with pinkish reverse. Whitish aerial mycelium. Small traces of yellowish soluble pigment. No sporophores.

Tomato paste agar:[1] Good growth with smooth surface. Vegetative mycelium hyaline to yellowish with pinkish reverse. Whitish aerial mycelium with pink tinge. Traces of soluble pigment. No sporophores.

Yeast-extract-glucose agar:[2] Abundant growth yellowish to pink with rough surface. Scanty aerial mycelium. No pigmentation of media.

Emerson glucose agar:[1] Abundant growth yellowish to pale orange with rough surface. Aerial mycelium becomes pinkish (2/B/8). Pale amber soluble pigment.

Oatmeal-mix agar: Good growth, smooth, yellowish with light orange tinge. Aerial mycelium whitish to pink. Amber soluble pigment.

Oatmeal-mix agar contained in addition to oatmeal (20 g. cooked oat flakes filtrate): Enzymatic casein hydrolyzate 5 g.; beef extract 3 g.; sucrose 10 g.; agar 40 g. in 1000 ml. H$_2$O dist.; pH corrected to 6.5 after sterilization.

Benett's agar: Good growth, yellowish turning orange-yellow. Aerial mycelium becoming pinkish. Light amber pigment.

Benett's agar contained: Yeast autolyzate 1 g.; beef extract 1 g.; enzymatic casein hydrolyzate 2 g.; glucose 10 g.; agar 20 g.; distilled water 1000 ml.; pH 6.8 after sterilization.

Penassay agar (Difco): Growth poor.

Penassay agar contained: Peptone 6 g.; yeast autolyzate 3 g.; beef extract 1.5 g.; enzymatic casein hydrolyzate 4 g.; dextrose 1 g.; agar 20 g.; H$_2$O dist. 1000 ml.; pH 6.6 after sterilization.

Yeast-extract molasse agar: Abundant, rough growth, colourless to yellowish. Whitish aerial mycelium. Deep amber soluble pigment (12/H/10).

Yeast-extract molasse agar contained: Glycerol 7.5 g.; yeast-extract 5 g.; NaCl 4 g.; agar-agar 30 g.; H$_2$O dist. 1000 ml.; pH corrected to 6.0 after sterilization.

Czapek Dox-sucrose agar:[2] Poor growth, thin and colourless to light melon (11/A/8). Traces of pinkish white aerial mycelium. No soluble pigment.

Potato glucose agar:[2] Poor growth, thin and colourless. Traces of whitish aerial mycelium. No soluble pigment.

Potato wedge:[2] Poor development hyaline, colour of wedge not changed.

Glucose-asparagine agar:[2] Fair growth with smooth surface. Thin vegetative mycelium of light orange pink colour (10/B/12) and yellowish reverse. No aerial mycelium. Some light yellow soluble pigment.

Glycerol-asparagine agar: As glucose-asparagine agar.

Glycerol-asparagine agar contained: Glycerol 10 g.; asparagine 0.5 g.; K$_2$HPO$_4$ 1 g.; agar 20 g.; H$_2$O fontis 1000 ml.; pH after sterilization 7.0.

Nutrient agar: Moderate growth with smooth surface; melon pink to orange (2/B/10) with yellowish orange reverse. Aerial mycelium pinkish white. Soluble pigment absent.

Nutrient agar contained: Peptone 5 g.; beef extract 3 g.; dextrose 1 g.; NaCl 5 g.; agar 20 g.; H$_2$O dist. 1000 ml.; pH after sterilization 6.8.

Pridham's agar: Moderate growth, smooth, colourless with lobster red (2/G/11) spots. Pink aerial mycelium. No pigmentation of medium.

Pridham's agar contained: (NH$_4$)$_2$SO$_4$ 2.5 g.; KH$_2$PO$_4$ 2.5 g.; K$_2$HPO$_4$ 5.5 g.; MgSO$_4$ 1 g.; CuSO$_4$ (sol. 0.5%) 1 ml.; FeSO$_4$ (sol. 0.1%) 1 ml.; ZnSO$_4$ (sol. 0.2%) 1 ml.; MnSO$_4$ (sol. 0.8%) 1 ml.; Bacto agar 20 g.; sucrose 20 g.; H$_2$O dist. 1000 ml.; pH after sterilization 6.7.

Inorganic salts-salt agar: Poor growth, colourless to light orange pink. Starch hydrolysis doubtful. Scarce white aerial mycelium.

It contained: soluble agar Difco 10 g.; K$_2$HPO$_4$ 1 g.; MgSO$_4$·7H$_2$O 1 g.; NaCl 1 g.; (NH$_4$)$_2$SO$_4$ 2 g.; CaCO$_3$ 2 g.; agar 20 g.; H$_2$O fontis 1000 ml.; pH after sterilization 7.4 to 7.6.

---
[1] Prepared according to T. G. Pridham et al., "A Selection of Media for Maintenance and Taxonomic Study of Streptomyces," Antibiotics Annual, 1956–1957, pages 947–953.
[2] Prepared according to S. A. Waksman, The Actinomycetes, Chronica Botanica Co., Waltham, 1950, pages 193–197.

Dextrose-tryptone agar: Abundant growth, orange pink with golden yellow to orange pink reverse. Pinkish aerial mycelium. Light golden yellow (9/J/6) soluble pigment.

Dextrose-tryptone agar contained: Bacto tryptone 5 g.; dextrose 20 g.; Bacto agar 20 g.; $H_2O$ dist. 1000 ml.; pH after sterilization 7.5.

Hickey and Tresner's cobalt agar:[1] Moderate growth, hyaline to light pinkish orange. Some aerial mycelium. Some yellowish soluble pigment.

Tyrosine agar:[2] Poor growth.

Ca-malate-agar: Fair growth, colourless. Aerial mycelium whitish with pink tinge. No soluble pigment. Partial digestion of Ca-malate.

Ca-malate-agar contained: Calcium malate 20 g.; $NH_4Cl$ 0.5 g.; $K_2HPO_4$ 0.5 g.; agar 18 g.; $H_2O$ dist. 1000 ml.; pH after sterilization 6.3.

Dorset's albumin agar:[2] Fair growth, pink. No aerial mycelium or pigmentation of medium.

Gelatine: No pigmentation. Liquefaction slow and incomplete.

Gelatine contained: Beef extract Difco 3 g.; peptone 5 g.; gelatine 120 g.; NaCl 5 g.; $H_2O$ dist. 1000 ml.; pH after sterilization 6.8–6.9.

Nitrates: Surface growth with pinkish aerial mycelium. No reduction to nitrites. Broth becomes yellowish.

The nitrates medium contained: Beef extract 5 g.; peptone 5 g.; $KNO_3$ 1 g.; $H_2O$ dist. 1000 ml.; pH after sterilization 6.3.

Litmus milk: No peptonisation or coagulation. Slight alkaline reaction.

Litmus milk contained: Litmus milk powder Difco 105 g.; $H_2O$ dist. 1000 ml.; pH after sterilization 6.8.

Cellulose: No growth on filter paper discs placed on carbohydrate free mineral base agar.

Temperature: Optimum 28° C. At 37° C. growth takes place but characters are less distinct.

Morphology of colony: On Benett's agar, this strain forms small (usually the diameter not more than 2 mm.) colonies with well defined contours, compact but rough surface; covered with whitish aerial mycelium. A great number of colonies plated on agar do not develop aerial mycelium and remain in their orange-red vegetative mycelium that grows to considerable thickness until they assume rock-like appearance.

Sporulation: ME/93 usually does not sporulate on the above listed culture media. When sporulation takes place, spores appear in long chains somewhat flexuous. Spores are ellipsoidal to oblong (0.8–1.0$\mu$ x 3.0–5.0$\mu$).

Test for utilisation of carbon sources: Cultures on mineral base agar supplemented with various sources, according to Pridham and Gottlieb, did not show any growth on Raffinose, acetate, citrate, glycine. All other carbon sources tested supported moderate to good growth (xylose, arabinose, glucose, rhamnose, fructose, mannose, galactose, lactose, sucrose, maltose,, glycerol, mannitol, inositol, succinate and salicin).

The *Streptomyces mediterranei* ATCC 13685 can be characterised by:

(1) Its non adherence to the chromogenic group of Streptomycetes.
(2) On most media vegetative growth assumes a yellowish to light pinkish orange.
(3) Aerial mycelium is pinkish white. Poor sporulation on most media.
(4) Acetate, citrate, raffinose and glycine are not utilized as carbon sources.

As far as the production of rifamycin is concerned, as already stated, this invention is not limited to the use

---

Footnote in col. 1.

of the above described strain of Streptomyces ATCC 13685 or other natural strains corresponding to the same description, but also includes the use of variants of these strains, such as are obtained, for example, by selection of variants or mutants obtained by treatment of spore suspensions with mutagenic agents, such as U.V. irradiation, mustard gas etc. When, therefore, reference is made hereinafter in this specification, and in the claims, to *Streptomyces mediterranei*, such term is to be understood as including the similarly active, naturally occurring and artificially produced mutants and variants.

To produce rifamycin a rifamycin-producing microorganism is grown at a temperature between 25° and 37° C., and preferably at 28° C., in submerged aerated culture in an aqueous culture medium containing an assimilable nitrogen source. As carbon source the below listed carbohydrates and carbon derivatives can be used, i.e. glucose, xylose, lactose, sucrose, maltose, glycerol, mannitol, inositol, succinate starch, dextrins etc. Useful nitrogen sources are, for instance, amino acids and mixtures thereof, peptides and proteins and their hydrolysates such as peptone, meat extracts, yeast extract, soybean meal, corn steep liquor, fish soluble, aqueous fractions from seed grains, distillers' solubles etc. The fermentation can be carried out for 24 to 120 hours. The initial pH usually adjusted at about 7 to 8, decreases in the course of fermentation to 5–7. Usually the best results are obtained after a fermentation time of 48–72 hours. After this time an excellent yield of antibiotic is obtained.

After completion of the fermentation rifamycin can be isolated according to the following procedure.

The fermentation medium is filtered at the final pH of 5.0 to 7.0, or after having been adjusted to 7.5–8.5, at a temperature of 26–28° C. or lower. The filtrate is quickly adjusted to acidic pH to ensure the best stability of the antibiotic substance. The activity is extracted by water insoluble solvents such as butanol, ethyl, propyl, butyl or amyl acetate, chloroform. The ratio between the volume of the medium and that of the solvent may vary according to the selected solvent; usually a ratio 2:1 to 10:1 is used.

A part of the antibiotic substance is insoluble in acidic medium, and can be directly recovered from the medium, if desired, by filtration; in any case, the filtrate must be extracted with the organic solvent to recover most of the antibiotic activity. The insoluble portion can be dissolved in the same solvent and combined with the organic extract coming from the extraction of the filtrate. The residual aqueous medium after extraction still contains a microbiological activity which cannot be extracted by the usual organic solvent. However, it can be absorbed on charcoal at slightly acidic pH and recovered by elution with water and soluble alcohols, such as methanol or ethanol.

The mycelium also retains some microbiological activity. This can be extracted from the mycelium by the above mentioned solvents or simply by several water washings, and from the acidified aqueous solution the antibiotic activity is transferred to the above mentioned solvents.

Once most of the antibiotic activity has been transferred to the solvent, this is distilled in vacuo to a small volume under a nitrogen stream at a temperature below 30° C. By addition of petroleum ether or other hydro-carbon mixtures a brown substance precipitates which shows a high activity against gram-positive bacteria and mycobacteria. This crude product is an amorphous powder of a light brown to dark brown colour which sometimes has a greenish nuance. It consists of a mixture of substances showing antibiotic activity. A chromatography on Whatman paper No. 1 using a solvent system formed by water containing 3 percent ammonium chloride and 1 percent ascorbic acid, developed on an agar plate inoculated with *Sarcina lutea*, shows at least 5 inhibition zones which we have defined with the capital letters A to E in increasing order of the Rf value starting from the point of deposition of the drop. Spots C and D are usually greater than the others. The existence of other fractions cannot be excluded. FIGURE 1 gives a chromatogram obtained as hereinbefore described.

Instead of precipitating the antibiotic mixture from the extraction solvent, this may be again extracted by buffer solutions at pH 7.0 to 7.5 and then at pH 10.0 to 10.5; the adjustment of pH allows an approximate separation of the several fractions forming the total crude powder. At pH 7.0 to 7.5 rifamycin B, of marked acidic nature, is selectively extracted. The other fractions are extracted at higher pH. Due to the low stability of the antibiotics in neutral and alkaline medium it is necessary to employ buffer solutions containing 0.5 to 3 percent of ascorbic acid or other substances having similar stabilising effect. The volume ratio between the solvent and the alkaline buffer solution varies broadly with the used solvent and the pH value. From a solution in ethyl acetate containing 1 percent of the activity, three extractions with $\frac{1}{10}$ in volume of the buffer solutions at pH 7.0–7.5 are carried out to transfer the fraction B to the aqueous phase, and three extractions with $\frac{1}{3}$ in volume of the buffer solution at pH 10.0–10.5 with 1 percent ascorbic acid are necessary to bring the other components into the aqueous phase.

From the aqueous phase the antibiotics are obtained in a semi-pure state by acidification and extraction with a solvent such as ethyl acetate or chloroform, evaporation of the solvent and precipitation with petroleum ether. Alternatively, the antibiotics may be precipitated from the aqueous phase by acidification and collected.

Purifications of the crude mixture can be made by chromatography on various adsorbent agents such as for instance Florisil previously treated with a methanol solution of hydrogen chloride. The crude mixture is dissolved in a solvent such as e.g. ethyl acetate, adsorbed on a Florisil column and eluted with the same solvent or with solvent mixtures with increasing polarity. The eluates with the highest microbiological values are those containing rifamycin C and D.

We describe in the following the isolation process of the five main components of the crude antibiotic and some physical and chemical properties allowing their identification.

*Rifamycin A.*—It has an Rf value 0.00–0.10 on the chromatographic strip with the above described system. Rifamycin A is isolated from the crude mixture by countercurrent partition in a two phase system methanol:0.01 N hydrochloric acid/benzene:petroleum ether (10:5:15:5). After 160 transfers rifamycin A is collected in the tubes 150–160 directly from the light phase. After concentration and precipitation in petroleum ether rifamycin A is obtained in the form of dark brown amorphous powder.

Rifamycin A is insoluble in water, soluble in alkalies. When dissolved in ethyl acetate it shows in the visible an absorption spectrum at 460 m$\mu$. After shaking the ethyl acetate solution with an acidic aqueous 1 percent solution of stannous chloride the absorption maximum is shifted to 422 m$\mu$; the same effect can be obtained by shaking with an aqueous 1 percent solution of ascorbic acid. The maximum at 460 m$\mu$ can be again obtained by shaking the ethyl acetate solution with a 0.1 percent solution of potassium ferricyanide. Rifamycin A is probably of quinonic nature with possibility of reversible oxide-reduction.

*Rifamycin B.*—It has Rf value 0.20–0.30 on the chromatographic strip with the above described system. Rifamycin B is of markedly acidic nature and can be isolated by dissolving the crude mixture in a solvent such as ethyl acetate or chloroform and extracting it from the organic solution with phosphate buffer at neutral pH (6.5–7.5). Rifamycin B passes into the aqueous phase and can be either precipitated by the addition of acids or again extracted from the acidified water solution with ethyl acetate. After concentration of ethyl acetate fraction B precipitates in a semi pure grade. Further crystallisations from ethyl acetate or benzene yield the pure product.

Rifamycin B appears as yellow brilliant crystals. It becomes dark at 165° C. and does not melt below 300° C. The saturated water solution has pH 3.6. It is very slightly soluble in water and dilute mineral acids, soluble in bicarbonate solutions with evolution of carbon dioxide. In concentrated sulfuric acid it dissolves with red coloration. It is sparingly soluble in methanol, slightly in ethanol, chloroform, ethyl acetate and acetone, very slightly in benzene and practically insoluble in petroleum ether, carbon tetrachloride, ethyl ether and hydrocarbons. It decolourises potassium permanganate solutions, reduces Fehling's liquor, Tollens reagent, adsorbs bromine, is catalytically reduced by hydrogen. On treatment with nitrous acid and alkalies it gives an intense red colouration. It does not give the Molisch reaction and does not reduce triphenyltetrazolium. It reacts however with ferric chloride to give a red colouration.

The elemental analysis gave the following mean values: C, 61.75%; H, 6.72%; N, 1.88%; O, 29.22%; from this, the following crude formula can be derived: $C_{39}H_{47-53}NO_{14}$, the molecular weight thus lying between about 753,8 and 759.8. Rifamycin is optically active, showing $[\alpha]_{589}^{22}$ —11° (c. 1, methanol, determined in a photoelectric polarimeter).

A potentiometric assay in water methanol mixture shows two acidic functional groups: $pH_1{}^{\frac{1}{2}}$ about 2.8 (equivalent weight 780), $pH_2{}^{\frac{1}{2}}$ about 6.7 (equivalent weight 765). The molecular weight determined in cyclohexanol according to Rast is about 750. The U.V. and visible spectra in water show a shoulder at $$220-230 \text{ m}\mu \ (E_{1\,cm.}^{1\%}=513)$$

and two maxima at $$305 \text{ m}\mu \ (E_{1\,cm.}^{1\%}=246) \text{ and } 430 \text{ m}\mu \ (E_{1\,cm.}^{1\%}=202)$$

The maximum in the visible in ethyl acetate is at 415 m$\mu$. The U.V. and visible spectrum of rifamycin B in phosphate buffer at pH 7.3 shows maxima at 223 m$\mu$ ($E_{1\,cm.}^{1\%}$ 555), 304 m$\mu$ ($E_{1\,cm.}^{1\%}$ 275) and at 425 m$\mu$ ($E_{1\,cm.}^{1\%}$ 220)

The spectrum is illustrated in FIGURE 2.

The infra red spectrum of rifamycin B is shown in FIGURE 3. It shows absorption maxima at the following values, expressed in cm.$^{-1}$: 3465, 3330, 1742, 1730 (shoulder), 1705 (shoulder), 1673, 1602, 1575, 1550, 1445, 1342, 1300, 1267, 1240 (shoulder), 1205, 1180, 1165, 1102, 1073, 1048, 1020, 975, 948, 915, 905, 850, 795, 760, 730, 680.

Rifamycin B, being of acidic nature, gives salts with both inorganic and organic bases. We have prepared the mono and disodium salt, of which the former is slightly, the latter freely soluble in water. The solutions show pH 5.0 and about 7.0, respectively. These solutions are very stable.

The salts with the following organic bases have been also prepared: dibenzylamine, quinine, 1-p-chloro-benzyl-2 - pyrrolidylmethylbenzoimidazole, dibenzylethylenediamine, 2-methyl-6-aminoheptane etc. All these salts have a low solubility in water and show promise for therapeutical purposes.

*Rifamycins C and D.*—These fractions show almost identical Rf values in the indicated chromatographic mixtures (Rf=0.45–0.55). The inhibition zones are contiguous and joined by a large neck. Rifamycins C and D are isolated in a semi-pure condition from the crude mixture by countercurrent partition in a two-phase system formed by methanol:0.01-N hydrochloric acid/benzene:petroleum ether (10:5:15:5). With 85 transfers the maximum of rifamycin C is formed between the 55th and the 65th tube and of rifamycin D between 35th and 45th tube. By extracting the tube contents with benzene or ethyl acetate or chloroform or other similar solvents, concentration of the extracts and precipitation with petroleum ether or other hydrocarbon mixtures the two rifamycins are obtained as amorphous powders in a high degree of purity.

Rifamycins C and D appear as dark-brown powders with greenish nuances. They are soluble in the usual organic solvents, practically insoluble in water. An aqueous solution in buffer at pH 8.0–10.0 is obtained by adding ascorbic acid as a stabilising agent. The U.V. and visible spectra of the two rifamycins C and D are similar. The maxima at 385–390 m$\mu$ and 460 m$\mu$ in methanol and in ethyl acetate are very characteristic. The maximum at 460 m$\mu$ in ethyl acetate is shifted to 422 m$\mu$ after shaking the ethyl acetate solution of rifamycin C or D with a 0.1 percent aqueous solution of stannous chloride or a 1.0 percent aqueous solution of ascorbic acid. On further shaking with a 0.1 percent aqueous solution of potassium ferricyanide the spectrum shows again the maximum at 460 m$\mu$. This shows that rifamycins C and D are substances with reversible oxido-reduction properties, such as quinones.

*Properties of rifamycin C.*—Elemental analysis: C, 61.51%; H, 6.73%; N, 4.21%; O, 27.55% (by difference). Rifamycin C gives positive reactions with Tollens and Fehling reagents, with ferric chloride, iodoform and permanganate. The ninhydrine reaction is negative, but becomes positive after strong acid hydrolysis. The visible spectrum in ethyl acetate shows maxima at 388 m$\mu$ ($E_{1cm}^{1\%}$ 78) and at 460 m$\mu$ ($E_{1cm}^{1\%}$ 134)

Rifamycin C is insoluble in water, mineral acids and bicarbonate, soluble in sodium carbonate, methanol, ethyl acetate, chloroform and acetone, insoluble in ethyl ether and petroleum ether.

*Properties of rifamycin D.*—Elemental analysis: C, 62.17%; H, 6.58%; N, 3.53%; O, 27.72% (by difference). Rifamycin D gives positive reactions with the Tollens and Fehling reagents, with ferric chloride, iodoform and permanganate. The ninhydrine reaction is negative before and after hydrolysis. The visible spectrum in ethyl acetate shows maxima at 388 m$\mu$ ($E_{1cm}^{1\%}$ 79) and at 460 m$\mu$ ($E_{1cm}^{1\%}$ 115)

It is insoluble in water, mineral acids, bicarbonate, ethyl ether and petroleum ether, soluble in sodium carbonate, methanol, ethyl acetate, chloroform and acetone.

*Rifamycin E.*—This fraction shows an Rf value of about 0.7–0.8 on the chromatographic strip. It is isolated from the crude mixture by countercurrent partition with the methanol: 0.01-N hydrochloric acid/benzene: petroleum ether (10:5:15:5). With 160 transfers most of rifamycin E is isolated in the first 10 tubes, by extraction of the acidic aqueous phase with ethyl acetate, concentration of the extract and precipitation with petroleum ether. Fraction E is a light brown amorphous powder. The visible spectrum in ethyl acetate shows a maximum at 400 m$\mu$ which remains unaltered after shaking with dilute solutions or potassium ferricyanide or stannous chloride.

As above stated, difamycin and its components show a high degree of activity against gram-positive bacteria and mycobacteria. Biological tests have been carried out separately with rifamycin B and with a mixture of the rifamycins A, C, D and E which will be hereinafter defined as "rifamycin complex."

The following table is illustrative of the antibacterial activity in vitro of rifamycin B and of the rifamycin complex on a large number of gram-positive and gram-negative microorganisms. The figures represent the minimal inhibitory concentrations in $\gamma$/ml.

| Strain | Rifamycin B | Rifamycin complex |
|---|---|---|
| *Micrococcus pyogenes* var. *aureus* ATCC 6538 | 0.025 | 0.01 |
| *Micrococcus pyogenes* var. *aureus* ATCC 13301 | 0.1 | 0.025 |
| *Micrococcus pyogenes* var. *aureus* ATCC 9144 | 0.025 | 0.01 |
| *Micrococcus pyogenes* var. *albus* ATCC 12228 | 0.025 | 0.01 |
| *S. pyogenes* var. *aureus* gray Weinstein | 0.1 | 0.05 |
| *S. faecalis* ATCC 10541 | 0.5 | 0.05 |
| *S. hemolyticus* C 203 | 0.025 | 0.0025 |
| *S. mastitidis* ATCC 7077 | 0.5 | 0.05 |
| *S. bovis* ATCC 9809 | 0.25 | 0.025 |
| *Neisseria catarrhalis* ATCC 8176 | 0.5 | 0.05 |
| *Neisseria gonorrhaeae* ATCC 9826 | 2 | 0.1 |
| *Diplococcus pneumoniae* XXXVII L | 0.05 | 0.01 |
| *Sarcina lutea* ATCC 9341 | 0.1 | 0.025 |
| *Sarcina subflava* ATCC 7468 | 0.5 | 0.025 |
| *M. flavus* ATCC 10240 | 0.25 | 0.01 |
| *B. subtilis* ATCC 6633 | 2.5 | 0.25 |
| *B. cereus* ATCC 10876 | .5 | 0.25 |
| *B. anthracis* M 401 | 1 | 0.05 |
| *Clostridium perfringens* ATCC 3226 | 0.5 | 0.05 |
| *Klebsiella pneumoniae* ATCC 10031 | 1,000 | 20 |
| *Klebsiella pneumoniae capsulata* M 117 | 2,500 | 100 |
| *Escherichia coli* McLeod 10536 | 1,000 | 50 |
| *Pseudomonas aeruginosa* Gottlieb | 2,000 | 75 |
| *Pseudomonas fluorescens* ATCC 11251 | 500 | 25 |
| *Proteus vulgaris* X 19 H ATCC 881 | 1,000 | 50 |
| *Proteus morganii* ATCC 9237 | 2,500 | 50 |
| *Proteus rettgeri* ATCC 9919 | 1,000 | 50 |
| *Shigella sonnei* ATCC 9290 | 5,000 | 75 |
| *Shigella dysenteriae* ATCC 9583 | 500 | 20 |
| *Salmonella typhi* M 507 | 2,500 | 150 |
| *Salmonella paratyphi* ATCC 9150 | 2,500 | 150 |
| *Salmonella schottmuelleri* ATCC 9149 | 5,000 | 150 |
| *Bruccella abortus* M 311 | 150 | 10 |
| *Brucella melitensis* ATCC 4309 | 75 | 10 |
| *Pasteurella pestis* ATCC 87 NIH | 100 | 10 |
| *Mycobacterium ranae* M 215 | 50 | 10 |
| *Mycobacterium phlei* ATCC 10142 | 0.05 | 0.5 |
| *Mycobacterium minetti* M 421 | 100 | 10 |
| *Mycobacterium app.* 607 | 100 | 10 |
| *Nocardia asteroides* CBS | 350 | 50 |
| *Mycobacterium tuberculosis* var. *hominis* H 37 Rv ATCC 9360 | 0.05 | 2 |
| *Candida albicans* ATCC 10231 | >2,500 | >200 |
| *Trichophyton mentagrophytes* ATCC 8757 | >200 | >200 |

From the above figures it can be seen that the antibiotics are particularly active on gram-positive microorganisms with some degree of activity on the bacilli.

The acute toxicity of rifamycin B has been tested and found to be extremely low, particularly if it is borne in mind that the antibiotic has a very high degree of activity. The following table gives the obtained results.

| Animal | Intravenous | $LD_{50}$ in mg./kg., Intraperitoneal | Subcutaneous |
|---|---|---|---|
| Mouse | 2,040 | >2,000 | >2,000 |
| Rat | 1,680 | >2,000 | >2,000 |

The acute toxicity of the rifamycin complex, although not so favourable, is however still very low and ensures a wide range of safety. The intravenous administration to mice gave a $LD_{50}$ of 262 mg./kg. The in vivo activity of rifamycin complex has been tested with very satisfactory results on mice severely injected with several pathogenic gram-positive microorganisms. All the injections here quoted have been obtained by intraperitoneal injection of 10 to 100 lethal doses of a 15–20 hours old culture of the pathogenic microorganisms. While the control animals always died 2–3 days after the infection, the final survival of treated animals was always scored 12 days after the beginning of the experiments.

Some of the results thus obtained are summarized in the following table.

In vivo activity of rifamycin complex by subcutaneous administration for 7 days.

| Infection | Antibiotic | Daily dose, mg./kg. | Administrations per day | Survival after 12 days |
|---|---|---|---|---|
| Streptococcus haemolyticus 6203. | rifamycin complex. | 100 | 2 | 20/20—100% |
|  |  | 75 | 2 | 20/20—100% |
|  |  | 50 | 2 | 20/20—100% |
|  |  | 30 | 2 | 19/20— 95% |
|  |  | 20 | 2 | 13/20— 65% |
|  |  | 10 | 2 | 4/20— 20% |
| Staphylococcus aureus Weinstein. | rifamycin complex. | 100 | 2 | 20/20—100% |
|  |  | 75 | 2 | 20/20—100% |
|  |  | 30 | 2 | 19/20— 95% |
|  |  | 20 | 2 | 9/20— 45% |
|  |  | 10 | 2 | 2/20— 10% |

On the other side, the great efficacy of rifamycin B in experimental infections is clearly shown by the following table, whereby it is to be noted that the daily dose was given in four daily administrations:

| Organism | Beginning of treatment after infection hours | Daily dose, mg./kg. | Survivors | | $ED_{50}$, mg./kg., and confidence limits |
|---|---|---|---|---|---|
| | | | No. | Percent | |
| Streptococcus hemolyticus C 203. | 0 | 150 | 15/15 | 100 | 86 (109–84) |
|  | 0 | 125 | 13/15 | 87 |  |
|  | 0 | 100 | 9/15 | 60 |  |
|  | 0 | 75 | 1/15 | 7 |  |
|  | 0 | 50 | 0/15 | 0 |  |
| Streptococcus hemolyticus C 203. | 6 | 300 | 19/20 | 95 | 170 (194–149) |
|  | 6 | 250 | 18/20 | 90 |  |
|  | 6 | 200 | 14/20 | 70 |  |
|  | 6 | 150 | 6/20 | 30 |  |
|  | 6 | 100 | 1/20 | 5 |  |
| Diplococcus pneumoniae XXVII L. | 0 | 200 | 20/20 | 100 | 110 (132–92) |
|  | 0 | 150 | 17/20 | 85 |  |
|  | 0 | 125 | 13/20 | 65 |  |
|  | 0 | 100 | 8/20 | 40 |  |
|  | 0 | 75 | 2/20 | 10 |  |
| Diplococcus pneumoniae XXVII L. | 6 | 300 | 20/20 | 100 | 190 (211–172) |
|  | 6 | 250 | 18/20 | 90 |  |
|  | 6 | 200 | 12/20 | 60 |  |
|  | 6 | 150 | 2/20 | 10 |  |
| Staphylococcus pyogenes var. aureus-gray M 551. | 0 | 400 | 13/14 | 93 | 305 (332–279) |
|  | 0 | 350 | 9/14 | 64 |  |
|  | 0 | 300 | 6/14 | 43 |  |
|  | 0 | 250 | 4/14 | 14 |  |
|  | 0 | 200 | 1/14 | 0.7 |  |

It appears that rifamycin complex shows a very strong activity in controlling mice infections due to Streptococcus and Staphylococcus and in general to gram positive bacteria.

Rifamycin B, although less active, nevertheless shows a still better therapeutic coefficient in view of its exceedingly low toxicity. In humans, good blood levels of antibiotic are obtained with daily doses of 500–1000 mg. by intramuscular administration.

The antibiotic has proven of extreme usefulness in patients suffering from abscesses of different localization, mastitis, purulent otitis media etc. The applied daily doses was generally of about 2 g. administered in two intramuscular injections. Quick fall of temperature was always observed, with resolution of the inflammatory process in not more than 3–4 days of treatment. The topical application on infected wounds of different types by using water solutions of the antibiotic was also successful, giving rise to quick decrease of pus and secretion generally, with subsequent rapid healing of the wounds.

These results were often obtained after the treatment with other antibiotics had been unsuccessful.

Rifamycin B has given excellent results in the clinical treatment of dental abscess, phlegmon, post surgical diarrhea, and rheumatic pericarditis. It has also been found to be of great clinical value in the treatment of otitis media, furunculosis, chlolecystitis, mastitis, mammary abscess, pulmonary abscess, pyodermatitis, pleurisy, bronchitis, broncho-pneumonia, pneumonia, and fevers of unknown origin.

In order to better illustrate the subject of the invention we give the following two examples of fermentation of *Streptomyces mediterranei* ATCC 13685.

Example 1

A culture of *Streptomyces mediterranei* ATCC 13685 was propagated for 6–8 days on Bennet's agar at 28° C. The organism was rinsed from the agar slant and aseptically inoculated into a 500 ml. flask containing 100 ml. of seed medium of the following composition:

|  | Grams |
|---|---|
| Beef extract | 5 |
| Yeast extract | 5 |
| Peptone | 5 |
| Casein hydrolysate | 3 |
| Glucose | 20 |
| NaCl | 1.5 |
| $H_2O$ to 1 litre. | |

The pH was adjusted to 7.3 with NaOH.

The flasks thus inoculated were shaken for 48 hours at 28° C. in an alternative shaker. One seed flask was inoculated into a 10 litre prefermenter containing 4 litres of the above seed medium. The fermentation was run at 28° C. with an 800 r.p.m. agitation and 1 v./v./m. aeration. After 24 hours of growth the mycelium had a strongly fragmented appearance. The value of packed cells was 3–5%. In the next stage a glass fermenter of 20 litres with 10 litres of the following fermentation medium was employed:

| | |
|---|---|
| Soybean meal | g— 5 |
| $(NH_4)_2SO_4$ | g— 7 |
| $MgSO_4.7H_2O$ | g— 1 |
| Glucose | g— 50 |
| $KH_2PO_4$ | g— 3 |
| $CaCO_3$ | g— 9 |
| $CuSO_4.5H_2O$ | mg— 3.3 |
| $FeSO_4.7H_2O$ | mg— 10 |
| $ZnSO_4.7H_2O$ | mg— 50 |
| $MnSO_4.4H_2O$ | mg— 4 |
| $H_2O$ to 1 litre. | |

The pH was corrected to 7.0 with NaOH. Sterilisation for 30 minutes at 120° C.

As inoculum 10 percent of the prefermenter was used. The fermentation was run at 28° C. with an agitation of 800 r.p.m. and 0.8 v./v./m. aeration. Silicone A was used as antifoam. In the course of the fermentation the broth assumed a characteristic orange-red colour. After 48 hours of growth a volume of 20–25 percent of packed cells was obtained. The pH of the broth was 5.6–5.4.

Highest antibiotic activity was obtained after 40–50 hours (300–400 γ/ml. of the antibiotic mixture) when the broth was harvested.

Example 2

A culture of *Streptomyces mediterranei* ATCC 13685 was prepared in a shaken flask as described in Example 1. For the preculture it was propagated in a 10 litres glass fermenter with 4 litres of medium containing:

| | |
|---|---|
| Lactose | g— 10 |
| Glucose | g— 10 |
| $(NH_4)_2SO_4$ | g— 7 |
| Soybean meal | g— 5 |
| $MgSO_4.7H_2O$ | g— 1 |
| $KH_2PO_4$ | g— 1 |
| $ZnSO_4.7H_2O$ | mg— 20 |
| $CuSO_4.5H_2O$ | mg— 5 |

After 24 hours of growth the volume of packed cells was 6–8 percent. A 10 percent inoculum was used for a 20 litres glass fermenter with 10 litres fermentation medium containing:

| | |
|---|---|
| Corn steep liquor | g-- 20 |
| Soybean meal | g-- 5 |
| $(NH_4)_2SO_4$ | g-- 6 |
| $MgSO_4.7H_2O$ | g-- 1 |
| Glucose | g-- 50 |
| $KH_2PO_4$ | g-- 3 |
| $CaCO_3$ | g-- 9 |
| $ZnSO_4.7H_2O$ | mg-- 2 |
| $CuSO_4.5H_2O$ | mg-- 5 |
| $H_2O$ to 1 litre. | | pH corrected to 7.0 with NaOH. Sterilisation for 30 minutes at 120° C. The duration of fermentation was of 60 hours at 28° C. The pH of the fermenting broth at harvest was 5.6–5.8. The final antibiotic activity was 400 γ/ml.

What we claim is:

1. An antibiotic substance of the group consisting of an antibiotic defined as rifamycin B, having melting point over 300°, being acidic in nature, having a mean elemental analysis of carbon, 61.75%, hydrogen, 6.72%, nitrogen, 1.88%, and oxygen, 29.22% and the specific rotatory power $[\alpha]_{589}^{22}$ −11° (c. 1, methanol), being very slightly soluble in water and benzene, practically insoluble in petroleum ether, carbon tetrachloride, ethyl ether and hydrocarbons, slightly soluble in ethanol, chloroform, ethyl acetate and acetone, showing in the ultraviolet and visible region of the spectrum a shoulder at 220–230 mμ and two maxima at 305 mμ and 430 mμ in water and three maxima at 223 mμ, 304 mμ and 425 mμ in phosphate buffer at pH 7.3, and exhibiting characteristic absorption bands in the infra red region of the spectrum when suspended in a hydrocarbon oil in solid form at the following frequencies expressed in reciprocal centimeters: 3465, 3330, 1742, 1730 (shoulder), 1705 (shoulder), 1673, 1602, 1575, 1550, 1445, 1342, 1300, 1267, 1240 (shoulder), 1205, 1180, 1165, 1102, 1073, 1048, 1020, 975, 948, 915, 905, 850, 795, 760, 730, 680, and its alkali metal and amine salts.

2. An antibiotic substance defined as rifamycin B, having melting point over 300°, being acidic in nature, having a mean elemental analysis of carbon, 61.75%, hydrogen, 6.72%, nitrogen, 1.88%, and oxygen, 29.22% and the specific rotatory power $[\alpha]_{589}^{22}$ −11° (c. 1, methanol), being very slightly soluble in water and benzene, practically insoluble in petroleum ether, carbon tetrachloride, ethyl ether and hydrocarbons, slightly soluble in ethanol, chloroform, ethyl acetate and acetone, showing in the ultraviolet and visible region of the spectrum a shoulder at 220–230 mμ and two maxima at 305 mμ and 430 mμ in water and three maxima at 223mμ, 304 mμ and 425 mμ in phosphate buffer at pH 7.3, and exhibiting characteristics absorption bands in the infra red region of the spectrum when suspended in a hydrocarbon oil in solid form at the following frequencies expressed in reciprocal centimeters: 3465, 3330, 1742, 1730 (shoulder), 1705 (shoulder), 1673, 1602, 1575, 1550, 1445, 1342, 1300, 1267, 1240 (shoulder), 1205, 1180, 1165, 1102, 1073, 1048, 1020, 975, 948, 915, 905, 850, 795, 760, 730, 680.

3. The monosodium salt of the antibiotic of claim 2.

4. The disodium salt of the antibiotic of claim 2.

5. The dibenzylethylenediamine salt of the antibiotic of claim 2.

6. The dibenzylamine salt of the antibiotic of claim 2.

7. A process for producing an antibiotic substance designated as rifamycin B, which comprises cultivating a *Streptomyces mediterranei* microorganism (ATCC 13685) in an aqueous nutrient medium under aerobic submerged conditions until substantial antibiotic activity is imparted to said medium, filtering the fermentation medium, adjusting the filtrate to acid pH, extracting the filtrate with a water-insoluble organic solvent of the class consisting of butanol, lower alkyl acetates and chloroform, and precipitating from the extract an antibiotic substance having a mean elemental analysis of carbon, 61.75%, hydrogen, 6.72%, nitrogen, 1.88% and oxygen, 29.22%.

8. A process for producing an antibiotic substance designated as rifamycin B, which comprises cultivating a *Streptomyces mediterranei* microorganism (ATCC 13685) in an aqueous nutrient medium under aerobic submerged conditions until substantial antibiotic activity is imparted to said medium, filtering the fermentation medium, adjusting the filtrate to acid pH, extracting the filtrate with a water-insoluble organic solvent of the class consisting of butanol, lower alkyl acetates and chloroform, extracting the solution with phosphate buffer at pH 6.5 to 7.5, and adding to the extract an acid to precipitate an antibiotic substance having a mean elemental analysis of carbon, 61.75%, hydrogen, 6.72%, nitrogen, 1.88% and oxygen, 29.22%.

9. A process as in claim 8, wherein the organic extraction solvent is butanol.

10. A process for producing an antibiotic substance designated as rifamycin B, which comprises cultivating a *Streptomyces mediterranei* microorganism (ATCC 13685) in an aqueous nutrient medium under aerobic submerged conditions until substantial antibiotic activity is imparted to said medium, filtering the fermentation medium, adjusting the filtrate to acid pH, extracting the filtrate with a water-insoluble organic solvent of the class consisting of butanol, lower alkyl acetates and chloroform, and adding to the extract a solvent miscible with the extraction solvent and in which the antibiotic is not soluble to precipitate an antibiotic substance having a mean elemental analysis of carbon, 61.75%, hydrogen, 6.72%, nitrogen, 1.88% and oxygen, 29.22%.

11. A process as in claim 10, wherein the solvent in which the antibiotic is not soluble is petroleum ether.

References Cited in the file of this patent

UNITED STATES PATENTS 2,999,048     Donovick et al.     Sept. 5, 1961

OTHER REFERENCES

Sensi et al.: Farmaco Scientific Ed., pp. 146–147, February 1959.